(12) United States Patent
Keene et al.

(10) Patent No.: US 10,444,747 B2
(45) Date of Patent: Oct. 15, 2019

(54) BLENDED SERVICE SCHEDULE FOR A POWER GENERATOR

(71) Applicant: Cummins Power Generation IP, Inc., Minneapolis, MN (US)

(72) Inventors: Kevin Keene, Minneapolis, MN (US); Benjamin S. Fuchs, Minneapolis, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 708 days.

(21) Appl. No.: 14/669,983

(22) Filed: Mar. 26, 2015

(65) Prior Publication Data

US 2016/0282231 A1 Sep. 29, 2016

(51) Int. Cl.
*G01M 15/00* (2006.01)
*G05B 23/02* (2006.01)
*G06Q 10/06* (2012.01)
*G06Q 50/06* (2012.01)

(52) U.S. Cl.
CPC ..... *G05B 23/0283* (2013.01); *G06Q 10/0639* (2013.01); *G06Q 50/06* (2013.01); *G01M 15/00* (2013.01)

(58) Field of Classification Search
CPC .......... G05B 23/0283; G06Q 10/0639; G06Q 50/06; G01M 15/00; G07C 5/0808
USPC ...................................................... 702/184
See application file for complete search history.

(56) References Cited

U.S. PATENT DOCUMENTS

| | | | |
|---|---|---|---|
| 5,216,612 A * | 6/1993 | Cornett | G05B 19/4184 700/96 |
| 6,067,486 A | 5/2000 | Aragones et al. | |
| 6,216,109 B1 | 4/2001 | Zweben et al. | |
| 6,738,748 B2 | 5/2004 | Wetzer | |
| 8,396,571 B2 | 3/2013 | Costiner et al. | |
| 8,401,726 B2 | 3/2013 | Bouvier et al. | |
| 2002/0049563 A1 | 4/2002 | Vetter et al. | |
| 2003/0100974 A1 | 5/2003 | Alvarez et al. | |

(Continued)

OTHER PUBLICATIONS

International Search Report and Written Opinion for International Application No. PCT/US2016/023594, dated Jun. 9, 2016, 10 pages.

*Primary Examiner* — Fernando L Toledo
*Assistant Examiner* — Adam S Bowen
(74) *Attorney, Agent, or Firm* — Foley & Lardner LLP

(57) ABSTRACT

A power generation system includes a power generator operatively connected to a plurality of sensors and a processor. The processor is configured to observe usage-based or event-based data regarding one or more components and consumables of the power generator. A usage-based service schedule is observed for the one or more event-based components and consumables. Operation-based data is received from the plurality of sensors regarding the functioning of the power generation system and one or more operation-based components and consumables of the power generator. An operation-based service schedule is determined for the one or more operation-based components and consumables based on the operation-based data. A blended service schedule is generated, the blended service schedule including the usage-based service schedule and the operation-based service schedule. The blended service schedule is then provided to at least one of a local monitor or a remote monitor.

23 Claims, 6 Drawing Sheets

(56) References Cited

U.S. PATENT DOCUMENTS

| | | |
|---|---|---|
| 2004/0176929 A1 | 9/2004 | Joubert et al. |
| 2007/0225881 A1 | 9/2007 | McAndrew et al. |
| 2008/0147263 A1* | 6/2008 | Sinex .................. G06Q 10/025 701/31.4 |
| 2010/0094490 A1* | 4/2010 | Alston .................. B63H 21/17 701/21 |
| 2011/0184564 A1 | 7/2011 | Amundson et al. |

* cited by examiner

| Event Code | Description | Service Type | Duration |
|---|---|---|---|
| 1 | • Check Engine Warning<br>• Check Charge Air Piping<br>• Check Spark Plug Wire<br>• Check Customer Water Quality<br>• Check Customer Gas Quality | Scheduled | 250 Hrs |
| 2 | • Check Supplemental Coolant Additives and Antifreeze<br>• Adjust overhead set<br>• Check Battery cables and connections<br>• Clean the Crankcase breather hose<br>• Test input to building fire detection/alarm system<br>• Test external e-stop<br>• Inspect electrical cables | Scheduled | 1000 Hrs |
| 3 | • Replace the coolant filter<br>• Check the turbocharger<br>• Inspect the flexible hoses<br>• Clean the engine with dry compressed air | Scheduled | 4000 Hrs |
| 4 | • Change coolant in all three CHP loops | Scheduled | 8000 Hrs |
| 5 | • Replace the heated oxygen sensor<br>• Replace the cylinder heads<br>• Replace the cooling fan and its drive belt<br>• Replace the fuel line seals<br>• Replace the fuel pressure regulator | Scheduled | 12000 Hrs |
| 6 | • Spark Plug | Predictive | |
| 7 | • Engine Efficiency | Predictive | |
| 8 | • Oil Life | Predictive | |
| 9 | • Oil Filter | Predictive | |
| 10 | • Air Filter | Predictive | |

FIG. 4

New Warning: 14011

Service Calendar

| Event Code | Activity Description | 0 | 1 | 2 | 3 | 4 | 5 | 6 | 7 | 8 | 9 | 10 | 11 |
|---|---|---|---|---|---|---|---|---|---|---|---|---|---|
| 0005 | Service Low Temperature Loop Heater | ★ | | | | | | | | | | | |
| 0012 | Check Exhaust Heat Exchanger Performance | ★ | | | | | | | | | | | |
| 0017 | Spark Plug Change | | | | ★ | | | | | | | | |
| 0007 | Oil Change | | | | | ★ | | | | | | | |

[Power Flow] [One Line] [Event Log] [Diagnostics] [Service] [TCO] [Setup]

FIG. 5

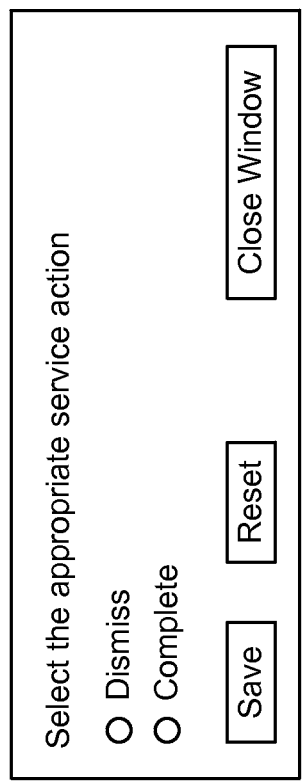

BLENDED SERVICE SCHEDULE FOR A POWER GENERATOR

FEDERAL FUNDING STATEMENT

This invention was made with government support under Contract No. DE-EE0003392 awarded by the U.S. Department of Energy. The U.S. Government has certain rights in this invention.

TECHNICAL FIELD

The present disclosure relates to service schedules for power generators.

BACKGROUND

Power generators (also referred to herein as generator sets or "gensets") are used for a variety of purposes. Typically, power generators utilize an internal combustion engine to drive an electric generator to produce electrical power. The generated electrical power may be used in a variety of applications. These applications can range from residential to commercial, including both portable and stationary uses, standby/backup power, and the like.

Power generators are broadly grouped into standby genset applications, where the genset remains off but ready to provide power in emergencies or when signaled, and prime power genset applications, where the genset runs continuously or semi-continuously to provide power, grid stability, surge/load leveling power, or local heat or cooling. In many applications, the costs can be substantial when the power generator is shut down for service, in particular in prime power applications where power generation revenue can be lost, replacement power fees incurred, and penalties or fines triggered from the utility or contract violation. As such, a general service/maintenance schedule may be included with the power generator that indicates when certain components and/or consumables should be examined and/or replaced. For example, a service schedule may indicate that every four thousand hours of operation the coolant filter should be replaced. An operator/attendant of the power generator can then plan and prepare for the scheduled downtime in order to reduce downtime costs. However, based on loads experienced, operating conditions, usage rates, and the like, power generators can experience usage variability and a variety of potential failure modes not accounted for in the generalized hour-based maintenance/service schedule. In addition, fleet based and/or prime power usage of power generators with their larger than standby genset average yearly run times presents an increased need for maintenance coverage and yet also allows for an increased service schedule flexibility and resultant efficiency gains.

SUMMARY

One embodiment relates to a power generation system. The power generation system includes a power generator operatively connected to a plurality of sensors and a processor. The processor is configured to: receive usage-based data regarding one or more usage-based components and consumables of the power generator; determine a usage-based service schedule for the one or more usage-based components and consumables based on the usage-based data; receive operation-based data from the plurality of sensors regarding one or more operation-based components and consumables of the power generator; determine a predictive operation-based service schedule for the one or more operation-based components and consumables based on the operation-based data; generate a blended service schedule, the blended service schedule including the usage-based service schedule and the predictive operation-based service schedule; and provide the blended service schedule to at least one of a local monitor and a remote monitor.

Another embodiment relates to a monitoring system for a power generator. The monitoring system includes a processor configured to: receive usage-based data regarding one or more usage-based components and consumables of a power generator; determine a usage-based service schedule for the one or more usage-based components and consumables based on the usage-based data; receive operation-based data regarding one or more operation-based components and consumables of the power generator; determine a predictive operation-based service schedule for the one or more operation-based components and consumables based on the operation-based data; generate a blended service schedule, the blended service schedule including the usage-based service schedule and the predictive operation-based service schedule; and provide the blended service schedule to at least one of a local monitor and a remote monitor.

Still another embodiment relates to a tangible, non-transitory computer-readable storage medium having machine instructions stored therein, the instructions being executable by a processor to cause the processor to perform operations comprising: receiving usage-based data regarding one or more usage-based components and consumables of a power generator; determining a usage-based service schedule for the one or more usage-based components and consumables based on the usage-based data; receiving operation-based data regarding one or more operation-based components and consumables of the power generator; determining a predictive operation-based service schedule for the one or more operation-based components and consumables based on the operation-based data; generating a blended service schedule, the blended service schedule including the usage-based service schedule and the predictive operation-based service schedule; and providing the blended service schedule to at least one of a local monitor and a remote monitor.

Yet another embodiment relates to a power generation system. The power generation system includes a power generator operatively connected to an engine speed sensor and a processor. The processor is configured to: receive usage-based data regarding at least one usage-based component and consumable of the power generator, the usage-based data including at least one of when to perform maintenance of a charge air piping, a spark plug wire, a battery cable, a coolant filter, a turbocharger, an emergency stop control, an electrical cable, an engine cleaning, a heated oxygen sensor, a cylinder head, a cooling fan and a cooling fan drive belt, a fuel line seal, and a fuel pressure regulator; determine an usage-based service schedule for the one or more usage-based components and consumables based on the usage-based data; receive operation-based data regarding at least one of an operation-based component and consumable of the power generator, the at least one operation-based component and consumable including a spark plug, a volume of oil, an oil filter, and an air filter; determine a predictive operation-based service schedule for the one or more operation-based components and consumables based on the operation-based data; generate a blended service schedule, the blended service schedule including the usage-based service schedule and the predictive operation-based service schedule; and provide the blended service schedule. The operation-based data includes at least one of an indication of a duration of operation, an engine speed, an oil temperature, a fuel consumption rate, an exhaust temperature, a compression ratio of an engine, a spark plug voltage, a brake mean effective pressure, an air-to-fuel ratio, a power output, and an engine temperature, of the power generator.

These and other features, together with the organization and manner of operation thereof, will become apparent from the following detailed description when taken in conjunction with the accompanying drawings.

BRIEF DESCRIPTION OF THE FIGURES

FIG. 4 is a table listing usage-based and operation-based components and consumables of a power generator according to an example embodiment.

FIG. 5 is a view of a blended service schedule for a power generator according to an example embodiment.

FIG. 6 is a view of an operator/attendant input screen for a monitoring system for a power generator according to an example embodiment.

DETAILED DESCRIPTION OF VARIOUS EMBODIMENTS

Figure 1:
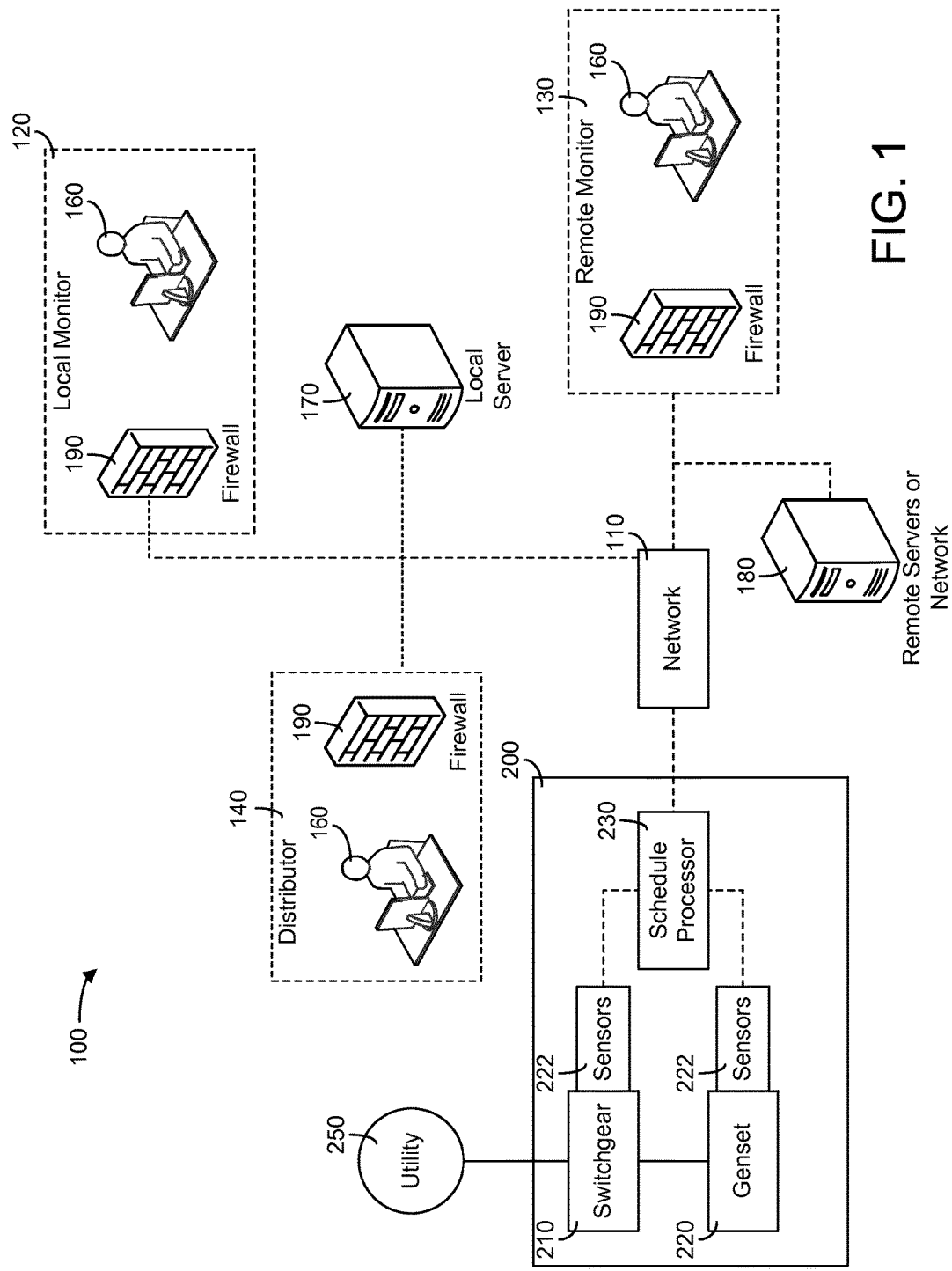
FIG. 1 is a schematic diagram of a monitoring system for a power generator according to an example embodiment.

Referring to the Figures generally, the various embodiments disclosed herein relate to systems and methods of generating maintenance/service schedules for a power generator. Although two power generators may be seemingly identical (i.e., of the same style and produced by the same manufacturer), the operating uses of such generators may vary greatly. For example, one power generator may run continuously while another power generator is used only for backup power. Components of the power generator running continuously may experience relatively greater aggravating conditions than the components in the power generator used as a backup power supply. The components experiencing relatively greater aggravating conditions may fail or potential fail sooner than the components of the power generator used as a backup power supply. Although service/maintenance schedules may be included with the power generators, the service/maintenance schedules may not account for the specific operating conditions that produce the aggravating conditions. Thus, fault conditions or potential fault conditions may go unnoticed. As such, what may have been relatively inexpensive service/maintenance may now be substantially more expensive due to, for example, aggravation of such faults conditions or inefficient service scheduling. Further, fixed calendar time and usage based service schedules for standby power generators may not be appropriate for continuous prime power generators, as standby power generators by definition do not experience the increased hours of use and varying demand levels of a continuous prime power generator and may not have the same fuel source (for example, diesel fuel versus natural gas), parts, or need to meet the same emissions requirements (for example, continuous use power generators are typically regulated more stringently under current EPA Tier 4 regulations than standby units and their emission systems generally will require more maintenance and will generally utilize more consumables, such as DEF). Prime power generators can include, but are not limited to continuous use power generators, surge or load leveling power generators, combined heat and power (CHP) power generators, tri-generation power generators (heat, power, and cooling), and bio-gas/renewable gas power generators (such as landfill gas, bio-digester gas, syngas, etc.). In addition, it is more likely that continuous prime power generators will be run as part of a larger installation (i.e., a multiple power generator installation), or as one of a larger distributed fleet or managed group of continuous prime power generators, instead of being a single standby power generator installation, allowing for potential group servicing efficiencies and savings to be gained.

As described herein, systems and methods are provided herein that create a blended service schedule. The blended service schedule includes a predictive operation-based service schedule and a usage-based service schedule. The usage-based service schedule refers to service requirements for components and/or consumables of a power generator based on the duration of operation of the power generator (e.g., hours of use, etc.). The usage-based service schedule may also include calendar time for service, generally referred to as a "non-predicted service", a "synchronous maintenance" or a "synchronous service" need (e.g., X maintenance after every Y hours or days of operation or calendar time in service). The predictive operation-based service schedule refers to a service schedule of predicted maintenance or service for components and/or consumables of the power generator. The predictive operation-based service schedule ("operation-base" or "function-based") is based on data (e.g., functional and efficiency, etc.) gathered regarding operation of the power generator. For example, the operation-based data may indicate that the spark plug voltage is above the recommended 30 kilovolts and, thus, likely to require maintenance. This is generally referred to as a "predicted", "unscheduled", or an "asynchronous maintenance" need or schedule. Accordingly, the predictive operation-based and, in turn, the blended service schedule provides a notification of this characteristic, to alert an attendant or operator of the power generator to inspect the spark plug, and suggests a service schedule to accomplish the predictive operation-based and usage-based service. As a result, the blended service schedule is tailored to the specific usage and functional operating conditions experienced by the power generator. In turn, the blended service schedule allows customers or attendants of the power generator to review and adjust the suggested service schedule to address failure and/or potential failure conditions in advance by providing advanced notifications, acquire warranty work that may be needed prior to expiration of such warranty, lower total cost of ownership, and substantially prevent down time of the power generator. There is often a fixed overhead associated with sending service personnel to an (often remote) site to perform maintenance. Accordingly, the blended service schedule enables the combining of the usage-based and operation-based data of multiple power generators associated with a location, customer, or a fleet to gain service efficiencies, limit unit downtime, and gain bulk maintenance cost and servicing time savings. Accordingly, the customer or attendant may realize a greater amount of cost-savings events. As a result, manufacturers may attract additional customers due to this cost-savings benefit.

As used herein, the terms "service" and/or "maintenance" refer to repair, the test of, checking, replacement, or inspection of one or more components or consumables of a power generator. For example, replacing a spark plug for the engine of a power generator would qualify as "service" and/or "maintenance" of such power generator. As also used herein, the term "component" refers to the various physical parts that make up a power generator. For example, a component may include the pistons, spark plugs, a turbocharger, wiring, sensors included with the power generator, etc. In comparison, the term "consumable" refers to matter that is either used by the power generator, or associated materials that deteriorate as a result of operation that must be either serviced or replaced. For example, a consumable may include the fuel for the power generator, fuel filter, oil, oil filter, coolant, coolant filter, etc. Finally, as used herein, the term "usage-based service schedule" refers to service, replacement, or maintenance schedules of components and/or consumables of a power generator that are time, calendar, or duration based. For example, the usage-based service schedule may indicate that the engine wiring should be checked every 250 hours of operation of the power generator. In another example, the coolant filter usage-based service schedule may indicate that it should be replaced every 4,000 hours of power generator operation. Accordingly, the usage-based service schedule is predetermined by hours of use or calendar time in service and not based on various operating conditions experienced by the power generator.

Referring now to FIG. 1, a monitoring system 100 for a power generator is shown according to an example embodiment. The monitoring system 100 may include one or more of a network 110, a local monitor 120, a remote monitor 130, a distributor or maintenance provider/service personnel 140 (collectively referred to as "distributor 140" for simplicity herein), and a power generator system 200. As shown, the power generator system 200 includes a switchgear 210 coupled to sensors 222, a power generator 220 coupled to sensors 222, and a schedule processor 230. As described more fully herein, the schedule processor 230 receives data regarding the power generator 220 from one or more sensors 222, determines when potential failures for the power generator 220 may occur, integrates this information with a usage-based service schedule for the power generator 220 to generate a blended service schedule that is then provided (e.g., presented to, made available for, etc.) over the network 110 to at least one of the local monitor 120, the remote monitor 130, or the distributor 140. A blended service schedule is a proposed schedule showing an item priority ordering of needed service based on the estimated time to completion and historical operation of the power generator/genset(s). Embodiments of the present disclosure further provide an ability for the operator or a remote distributor/maintenance provider to easily modify the proposed blended service schedule and bundle service schedule events across one or more power generators/gensets in a network.

In some embodiments, the schedule processor 230 may also provide an alert or notification regarding potential service or maintenance required for the power generator 220. This alert or notification can be provided to at least one of the local monitor 120, a remote monitor 130, and a distributor 140.

The schedule processor 230 may be implemented as a general-purpose processor, an application specific integrated circuit (ASIC), one or more field programmable gate arrays (FPGAs), a digital signal processor (DSP), a group of processing components, or other suitable electronic processing components. The schedule processor 230 may also include one or more memory devices 232 (see FIG. 2). The one or more memory devices 232 (e.g., RAM, ROM, Flash Memory, hard disk storage, etc.) may store data and/or computer code for facilitating the various processes described herein. Thus, the one or more memory devices 232 may be communicably connected to the schedule processor 230 and provide computer code or instructions to the schedule processor 230 for executing the processes described in regard to the schedule processor 230 herein. Moreover, the one or more memory devices 232 may be or include tangible, non-transient volatile memory or non-volatile memory. Accordingly, the one or more memory devices 232 may include database components, object code components, script components, or any other type of information structure for supporting the various activities and information structures described herein.

The network 110 enables the exchange of data, information, signals, and the like throughout the system 100. The network 110 includes any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. The network 110 may also include any number of intermediary networking devices, such as routers, switches, servers, etc. Accordingly, the network 110 may enable the schedule processor 230 to provide at least one of an alert or a blended service schedule to one or more of the local monitor 120, the remote monitor 130, and the distributor 140.

The local monitor 120 refers to an on-site monitoring unit or control system interface for the power generator system 200 whereas the remote monitor 130 refers to an off-site monitoring unit. The term "on-site" indicates that the local monitor is located in the same building, vicinity, location, etc. as the power generator system 200. The term "off-site" indicates the remote monitor is at a different location than the location of the power generator system 200. The monitors 120 and 130 may include one or more human-machine interfaces, such as a desktop computer, a mobile device such as a smartphone or mobile phone, a laptop computer, a tablet computer, and the like, whereby the human-machine interface allows for the exchange of information and data between an attendant 160 and the power generator system 200. Accordingly, the monitors 120 and 130 may receive and provide the blended service schedule and/or an alert or notification from the schedule processor 230 to an attendant 160. The monitors 120 and 130 may also receive one or more inputs from an attendant 160. The schedule processor 230 may use the input to update or modify the blended service schedule. In some embodiments, the monitors 120 and 130 may be supported by one or more servers (e.g., a local server 170 and a remote server 180) with firewalls 190. The firewalls 190 may isolate the monitors 120 and 130 to ensure or substantially ensure a secure file, data, and information exchange with the monitors 120 and 130 and the distributor 140. The distributor 140 represents any parts distributor and/or technician for the power generator 220. The distributor 140 may be embodied as a human-machine interface, like the monitors 120 and 130 described above, with an attendant 160 and a firewall 190. The distributor 140 can also include any maintenance providing system as well for the power generator system 200.

Referring generally to FIG. 1, FIG. 1 depicts a utility application of the power generator 220. In this embodiment, the power generator 220 may provide power through the switchgear 210 to the utility 250. The utility 250 includes any power plant that transmits the electricity generated by the power generator 220. The transmission destination includes residential areas (e.g., homes) and/or commercial areas (e.g., manufacturing plants). The switchgear 210 serves as an intermediary between the power generator 220 and the utility 250 to control the flow of electricity from the power generator 220 to the utility 250. Accordingly, the switchgear 210 may include a variety of switches, breakers, fuses, and control systems.

The schedule processor 230 uses operation characteristics (i.e., operation-based data) of the power generator 220 to determine potential failure modes of the power generator 220 to generate a blended service schedule. The schedule processor 230 receives the operation-based data from one or more sensors 222 coupled to the power generator 220. The sensors 222 may include sensors that indicate a temperature, a flow (e.g., electrical current, air, fuel, coolant, etc.), an air-to-fuel ratio, a pressure, a speed (e.g., engine RPM), a voltage and a frequency, a load, etc. After acquisition of the data, the sensors 222 may transmit the data by any wired and/or wireless protocol, like that mentioned above, to the schedule processor 230. While the schedule processor 230 may be a separate unit from the power generator 220 (and the switchgear 210) as shown in FIG. 1, the schedule processor 230 may also be a part of the power generator 220 (e.g., integrated into a control system of power generator 220).

As the power generator 220 may be installed or implemented in a variety of settings, the power generator 220 of embodiments of the present disclosure can be a variety of different types and sizes. These types include, but are not limited to, traditional electric generators or gensets, cogeneration devices (e.g., a combined heat and power generator), and/or trigeneration devices (e.g., a combined heat, cooling, and power generator). Furthermore, the power generator 220 may include an internal combustion engine that is powered by a variety of fuels (e.g., gasoline, ethanol, diesel, natural gas, land-fill gas, bio-gas, etc.). It is noted that power generators 220, as defined herein, can further include other forms of power generation, such as, but not limited to, solid oxide fuel cells (SOFC), proton exchange membrane (PEM) fuel cells, solar power generation, hybrid gensets, and variable speed gensets. Accordingly, in these embodiments, a consumable may include fuel (e.g., hydrogen, methanol, natural gas, etc.) and a component may include the anode, cathode, and membrane there between. Moreover, although a single power generator 220 is depicted, the power generation system 200 may include a plurality of power generators 220 of one or more types (e.g., a cogeneration and a trigeneration device) that are communicatively coupled with the schedule processor 230. As such, the schedule processor 230 may generate blended service schedules that correspond with each power generator 220 in the plurality of power generators.

Figure 2:
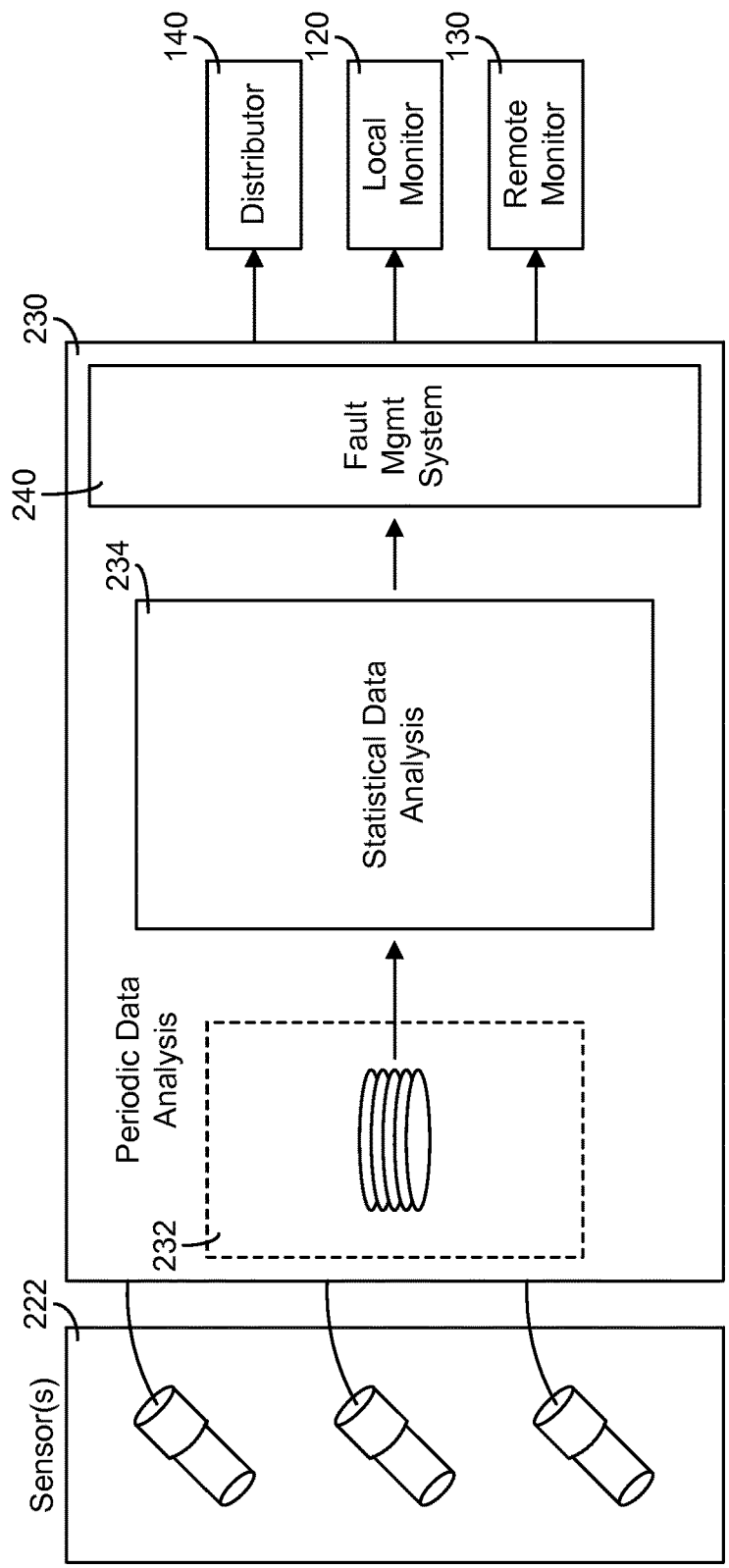
FIG. 2 is a schematic diagram of a schedule processor for a monitoring system for a power generator according to an example embodiment.
Figure 3:
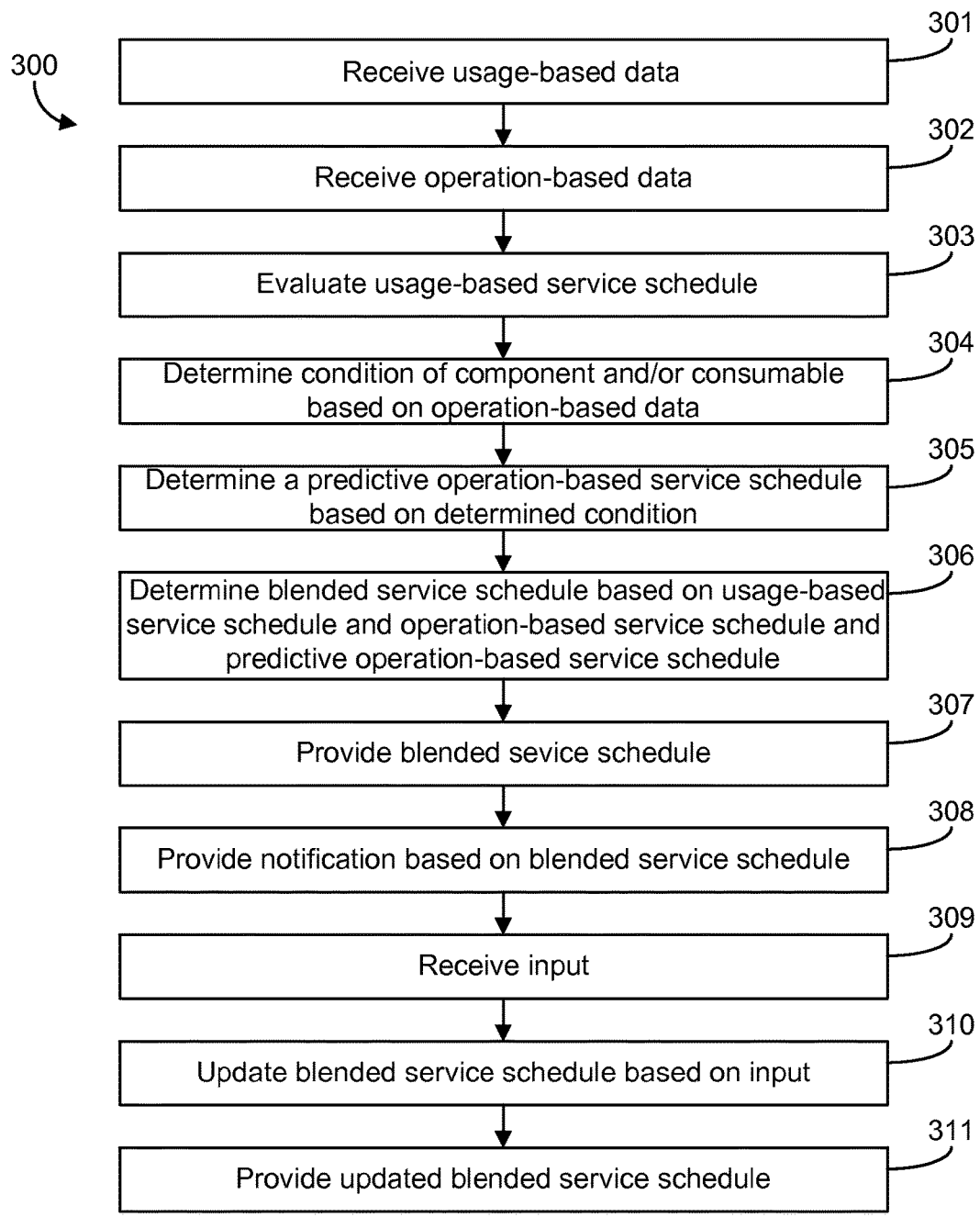
FIG. 3 is a flow diagram of a method of generating a blended service schedule according to an example embodiment.

Operation of the schedule processor 230 may be described with reference to FIGS. 2-3 to explain how the blended service schedule is generated. FIG. 2 is a more detailed depiction of the schedule processor 230 shown in FIG. 1 and FIG. 3 is a method of operating the schedule processor 230 to generate a blended service schedule. As shown in FIG. 2, the schedule processor 230 includes one or more memory devices 232, a statistical data analysis module 234, and a fault management system 240. The fault management system 240 receives data from the sensors 222 to determine estimated maintenance costs, power consumption, and the condition of one or more components (e.g., coolant pump) and/or consumables (e.g., oil). To determine the condition, the fault management system 240 may utilize statistical processes, predetermined acceptable operating ranges, lookup tables for relationships (e.g., oil life to hours of operation), and the like. Example embodiments of these processes are included with module 234 and described herein in regard to FIG. 3. The fault management system 240 may then manage service schedules for usage-based components and consumables with determined predictive service schedules to generate the blended service schedule. In some instances, the fault management system 240 may optimize the service order for the components and consumables listed on the blended service schedule based on the predictive and usage-based service schedules.

The method 300 may begin by the schedule processor 230 receiving usage-based data (301) regarding a power generator (e.g., power generator 220). In some embodiments, the schedule processor 230 may observe the usage-based data in connection with the below-described method. Usage-based data refers to information regarding when a component and/or a consumable of a power generator needs to be examined, replaced, or otherwise serviced. For example, usage-based data may include that the engine wiring needs to be checked every 250 hours of operation, that the electrical cables need to be inspected every 1,000 hours of operation, that the coolant needs to be replaced every 4,000 hours of operation, that the heated oxygen sensor needs to be replaced every 12,000 hours of operation, and the like. Usage-based data for various usage-based components and consumables of a power generator may be shown in FIG. 4 in rows where the "service type" is denoted as "scheduled." Accordingly, additional usage-based data may include when to perform maintenance of a charge air piping, a spark plug wire, a battery cable, a coolant filter, a turbocharger, an emergency stop feature, an engine cleaning, a cylinder head, a cooling fan and a cooling fan drive belt, a fuel line seal, and a fuel pressure regulator.

After reception of the usage-based data, the schedule processor 230 may receive operation-based data regarding the power generator. The operation-based data refers to data, information, and diagnostics regarding functioning of a component and/or a consumable of a power generator based on operation of the power generator. In one embodiment, the operation-based data is acquired in real-time by the sensors 222 and transmitted to the schedule processor 230. In other embodiments, the operation-based data is acquired and transmitted periodically (e.g., every 30 minutes of operation). The operation-based data may include, but is not limited to, an indication of the number of hours of operation of the power generator to date; the revolutions-per-minute ("RPM") of the engine; the oil temperature; the fuel flow/consumption; the exhaust temperature; the compression ratio; the brake mean effective pressure; the air-to-fuel ratio; the engine temperature; the power produced; and the like at each sampling point (i.e., each time the data is acquired and transmitted). Upon reception by the schedule processor 230, the operation-based data may be classified and stored (e.g., in the memory device 232). In one embodiment, the operation-based data is classified and stored based on the conditions yielding the specific operation-based data (e.g., the generator may produce 200 kilowatts at 1600 RPM and 125 kilowatts at 1200 RPM). In another embodiment, the operation-based data may be classified and stored based on the component and/or consumable it relates to. For example, all operation-based data regarding the oil filter may be chronologically, based on when it was acquired, stored in a file specific to the oil filter.

Based on the usage-based data, the schedule processor 230 determines a usage-based service schedule (process 303). The usage-based service schedule indicates when various types of services or maintenance may be required or scheduled for at least one usage-related component and/or consumable of the power generator. For example, if the power generator operates on average 200 hours every month and, to date, has operated 800 hours (approximately four months of operation), the usage-based service schedule may include a date for service of components and/or consumables in the fifth month that require service every 1,000 hours of operation (e.g., event code 2 in FIG. 4). As mentioned above, the usage-based service schedule may not account for aggravating operating conditions experienced by the power generator 220. Accordingly, the usage-based service schedule is independent of the functioning and operating conditions experienced by the power generator 220.

Due to the function, efficiency, and operational maintenance needs (the operation-based maintenance needs) of the power generator 220 being generally independent of the usage-based service schedule, various service conditions, components, and/or consumables of a power generator may not be properly accounted for in the usage-based service schedule. By not accounting for such components and consumables, potential failure modes and/or actual failure modes may go unnoticed. Accordingly, the schedule processor 230 utilizes the operation-based data to determine a condition of operation-based components and/or consumables (304). The condition refers to whether the operation-based component and/or consumable is operating in its acceptable operating range or not, or if the operation/functioning of the power generator 220 is indicating that it is not. In addition, a predictive replacement or maintenance need for an operation-based component can be determined from a deterioration rate of the operation-based (or in some cases a usage-based) component using historical operational data of the power generator 220 and known typical component deterioration rates. The acceptable operating ranges for each operation-based component and/or consumable may be stored and predefined in the memory device 232 of the schedule processor 230. However, because the schedule processor 230 may be implemented with a variety of power generators 220, the acceptable operating ranges or predictive failure rates are likely to differ from one power generator to the next. As mentioned above, operation-based components and/or consumables are those components and/or consumables that may or may not have associated usage-based service schedules. For example, referring to FIG. 4, FIG. 4 illustrates a service schedule table with usage-based and operation-based components and consumables for a power generator. An "event code" represents the type of service scheduled. In the example of FIG. 4, spark plug, oil life, oil filter, and air filter are components and consumables that the schedule processor 230 determines the condition of based on the operating data (i.e., operation-based components and/or consumables). Accordingly, the term "predictive" service type is utilized rather than a "scheduled" service type. As shown in FIG. 4, operation-based components and consumables may also include various diagnostic parameters, which may be determined based on the operation-based data using one or more formulas, algorithms, and processes (e.g., module 234). The diagnostic parameters may be indicative of a condition of at least one operation-based component and/or consumable, such as the engine of the power generator. Thus, at 304 in regard to the example of FIG. 4, the schedule processor 230 determines whether the spark plug, oil life/quality, oil filter, air filter, or other component are operating within predefined acceptable operating ranges based on the operation-based data.

To determine the condition of components and/or consumables based on the operation-based data, the schedule processor 230 may utilize various processes, algorithms, relationship correlations, formulas, look-up tables, and the like. The processes may be included in the statistical data analysis module 234 and may include, among other processes, a rate-of-change process, an Individual-Moving Range ("I-MR") process, and a threshold process. It should be understood that the above named processes are exemplary and not meant to be limiting. In other embodiments, many other different types of processes can be used with deviating from the spirit and scope of the present disclosure. In regard to the above named processes, the following are examples on how the schedule processor 230 can use them to generate the blended service schedule. As applied to compression in a cylinder, a rate-of-change process may show that the cylinder pressure has decreased over the past two months more rapidly than expected (e.g., based on the previous twelve months of operation). This rate-of-change may indicate that build-up is occurring within the cylinder. The schedule processor 230 may forecast the rate-of-change over the next three months to determine, predict, or estimate where potential failure could occur. In turn, the schedule processor 230 may insert "inspect cylinder" (or an event code corresponding to such an event, see FIG. 5) into the blended service schedule. In some embodiments, the schedule processor 230 may also provide an alert regarding this condition to the operators or monitoring system. An I-MR process depicts how measurements from the sensors 222 change over time including the deviation of each measurement from the previous measurement (the moving range aspect). If, for example, the deviation of a measurement is outside an acceptable range, the schedule processor 230 may determine that the component or consumable corresponding with that measurement may need to be inspected. A threshold process may be utilized for components or consumables to indicate condition. For example, if the current engine temperature exceeds a predetermined temperature, the schedule processor 230 may determine that various components should be examined that could cause such a temperature. As the schedule processor 230 may utilize more processes than described, the schedule processor 230 may also utilize certain processes with certain components and/or consumables. For example, an I-MR process may be utilized with oil life whereas a threshold process is utilized with the spark plugs. In any event, the condition of components and/or consumables is determined based on the operation-based data.

Based on the condition determined, at 305, the schedule processor 230 determines/generates a predictive operation-based service schedule that predicts, estimates, or determines the maintenance timeline for one or more components and/or consumables based on the operation data. For example, the schedule processor 230 may determine that based on the recent operating conditions of the power generator, the spark plugs may lose critical efficacy in three months, such that they should be serviced in two months or another time ahead of the three month date. In other words, the schedule processor 230 predicts, estimates, and/or determines service dates for components and consumables using the operation data. In one embodiment, if the schedule processor 230 determines the component and/or consumable is outside of a predefined acceptable range, the schedule processor 230 includes the component and/or consumable on the predictive operation-based service schedule and/or provides an alert regarding the component and/or consumable (i.e., processes 305-308). In one embodiment, the schedule processor 230 may list the components and/or consumables on the blended service schedule determined to be outside an acceptable operating range towards the top of the schedule (e.g., with the usage-based components and/or consumables with high priority maintenance needs). For example, referring to FIG. 5, the schedule processor 230 could insert an indicator (e.g., a "star") one week from today into the blended service schedule calendar. In this case, although the component and/or consumable may not need the immediate service, an attendant may be alerted of a potential condition and thus move forward or otherwise adjust schedule service visits and service type to compensate. In another embodiment, if a component and/or consumable is determined to be outside an acceptable operating range, an attendant may pre-program how this determination is accounted for in the blended service schedule. For example, the attendant may specify that all components and/or consumables determined to be outside of acceptable operating ranges are scheduled for service two weeks out (in regard to FIG. 5, a star in the "3" column). In another example, the attendant may decide to specify the service schedule for components and/or consumables determined to be outside of their acceptable operating range individually. For example, if the schedule processor 230 determines the oil filter or air filter are operating outside of their acceptable operating ranges, the operator/attendant may determine that the appropriate blended service schedule should indicate service for the oil filter two weeks out and the air filter three weeks out to be set and transmitted to the distributor/maintenance service 140 based on the operator/attendant's input (i.e., two weeks for the oil filter and three weeks for the air filter). In this embodiment, the attendant/operator of the power generator 220 may have a wide array of customization abilities in regard to the service schedule and attendant cost of operation-based and usage-based components and/or consumables.

In other embodiments, the schedule processor 230 may list the component and/or consumables determined to be outside an acceptable operating range on the blended service schedule based on when the service is estimated to be needed (e.g., one week out, two weeks out, etc.). Urgency may be determined in a variety of ways and may be determined in conjunction with process 304 (e.g., module 234). According to one embodiment, the modules, processes, formulas, relationships and the like used to determine the condition of the component and/or consumable may also provide a predictive indication or estimate of when service of the component and/or consumable is needed. Accordingly, the schedule processor 230 may place this information into the predictive operation-based service schedule and, ultimately, the blended service schedule. According to one embodiment, if the schedule processor 230 determines that a component and/or consumable is nearing its acceptable operating range, the schedule processor 230 may determine that the service work is relatively more urgent than an event with a considerable operating margin and therefore schedule it on the blended calendar within a more immediate time frame. Thus, each service item is sorted on the blended service calendar by priority in terms of service due, with past due items are given priority. For usage-based service components and/or consumables (i.e., synchronous maintenance), each service date is determined by a comparison of current operating hours (e.g., processes 302-303). For example, if the power generator has 950 current hours, the 1000 hour maintenance event will occur in 50 hours, or approximately two days if operated continuously. For predictive operation-based components and/or consumables (i.e., asynchronous maintenance needs), sensors provide information (i.e., operation data) to the control system which is used to estimate or predict a timeline for the next service event (e.g., processes 304-305). This handling of synchronous and asynchronous maintenance needs allows the two differing needs to be blended and/or timing adjusted in the blended service schedule and parts pre-order.

Accordingly, referring back to FIG. 3, at process 306, the schedule processor 230 determines a blended service schedule for the power generator. The blended service schedule displays and includes the usage-based service schedule and the predictive operation-based service schedule. As mentioned briefly above, the schedule processor 230 prioritizes the operation-based and usage-based components on the blended service schedule. In some embodiments, the prioritization process is included with process 306, when the schedule processor 230 determines the blended service schedule. The prioritization may be based on at least one of an urgency of service due (e.g., past due items are given priority, items to be serviced in the next three weeks are prioritized over items to be serviced one-year from now, etc.), historical operation (e.g., these items need to be serviced sooner than those items), an estimated time to completion, and an ability to easily bundle service events together. For example, if the oil is scheduled to be replaced in the next three weeks while the oil filter has a predicted service date of nine months from now, the schedule processor 230 may bundle the oil filter service with the oil change service due to the components being relatively easily serviced together. Accordingly, the schedule processor 230 may bundle service events for related components and consumables. In certain embodiments, an operator or attendant may specifically designate which components and consumables should be serviced together, such that the schedule processor 230 uses these designations in prioritizing items on the blended service schedule. An example blended service schedule with prioritized items is shown in FIG. 5.

In the example of FIG. 5, the blended service schedule lists upcoming service requirements and/or recommendations by event codes or type of service required (e.g., replace oil filter). The blended service schedule blends the service schedule for usage-based components and/or consumables with a predicted service schedule for operation-based components and consumables, where the predictive service schedule is determined by the schedule processor 230. The blended service schedule may be provided to at least one of the distributor 140, the local monitor 120, or the remote monitor 130 (process 307). In some embodiments, the schedule processor 230 may provide an alert or notification based on the blended service schedule (process 308). In one embodiment, if the blended service schedule indicates an upcoming replacement of a component or consumable, the schedule processor 230 may alert or notify the attendant 160 to order the component or consumable such that a repair technician has the component or consumable for the upcoming service date. In another embodiment, the alert or notification may be a reminder of an upcoming schedule service event. For example, the schedule processor 230 may provide a seven-day reminder for upcoming scheduled service events. The reminder may be provided to one or more of the distributor/maintenance provider 140, the operator/attendant 160, the local monitor 120, or the remote monitor 130. However, the attendant or operator may input a preference as to when or if alerts or notifications are provided. For example, the attendant may input seven day reminders for predicted oil changes and three day reminders for scheduled engine wiring inspections. Accordingly, the attendant/operator may customize the alert/notification function of the schedule processor 230 to best suit their application and/or desires.

In some embodiments, after providing the blended service schedule, the method 300 of FIG. 3 may be completed. In other embodiments, at process 309, the schedule processor 230 may receive an input. The input may include an approval/rejection, a service action taken, and/or other operator/attendant input. As mentioned above, the input may be either an approval or rejection of ordering a replacement part or component of the power generator 220. The service action taken may include a completion date, a dismissed date, or an extended date. The completion date indicates that the service required was completed on that date. A dismissed date indicates that the scheduled service was not completed and the otherwise scheduled serviced was dismissed on the provided date. An extended date allows an attendant to input a later date than the scheduled service date on the blended service calendar. For example, an attendant may reschedule the service event for the following month or look to combine the service event if the power generator is geographically proximate to other associated power generators or power generation locations also receiving service to accommodate consolidation into other scheduled service or maintenance.

After reception of the input, the schedule processor 230 updates the blended service schedule (process 310) and provides the updated blended service schedule (process 311) to one or more of the distributor/maintenance provider 140, the operator/attendant 160, the local monitor 120, or the remote monitor 130. Thus, if a repair technician completed the scheduled service and inputted this completion, the schedule processor 230 may remove that scheduled service from the blended service schedule. If the technician did not input this completion, the schedule processor 230 may continually indicate the need to provide the required service on the blended service calendar. In this configuration, the continuous indication of service need serves as a quality assurance protocol, such that services are completed and accounted for.

Referring to FIG. 5, a blended service schedule is shown according to an example embodiment. The example service schedule shows when various components and consumables should be serviced based on the event code. The blended service schedule of FIG. 5 is based on the example components and/or consumables of FIG. 4. As such, event codes 6-10 on the schedule represent operation-based components and/or consumables. According to one embodiment, the display of operation-based and usage-based items will be chronologically sorted starting with all items that have negative times. A negative time indicates that service of the component or consumable should have occurred, with the time since passing of the required service. A positive time indicates that the required service of the component or consumable is in the future and is not yet needed. It is noted that in some embodiments, components or consumables not yet needing service may still be moved forward and scheduled for service by one or more of the distributor/maintenance provider 140 or the operator/attendant 160 to take advantage of scheduled service visits. In various embodiments, the schedule processor 230 may be programmed to alter the suggested blended schedule to allow predetermined or selected components or consumables to automatically be moved forward or backward in the service scheduling if within a predetermined time threshold plus or minus, or if geographically proximate to other associated power generators or power generation locations also receiving service to accommodate their consolidation into other scheduled service or maintenance and thus assist in minimizing the number of service visits and time. If these associated or geographically proximate power generators are networked and are also utilizing the same or similar schedule processor 230 of an embodiment of the present disclosure the schedule processors 230 can be configured to work together to present a combined blended schedule to the distributor/maintenance provider 140 or the operator/attendant 160 to take advantage of scheduled service visits. Differing service types requiring differing levels of equipment or service personnel, service time requirements, and/or skill can also be grouped together in the proposed blended schedule and adjusted by the distributor/maintenance provider 140 or the operator/attendant 160. In some embodiments, the display may be color coded (e.g., all negative time items in red, all items due in the next ten days in yellow, and all other items in green).

As described above in regard to process 309, the schedule processor 230 may receive an input. FIG. 6 shows an example embodiment of an input screen for the blended service schedule. In this example, the attendant/operator may select dismiss or completion of the service action. Based on the input received by the schedule processor 230, the schedule processor 230 updates the blended service schedule accordingly.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The present disclosure contemplates methods, systems, and program products on any machine-readable media for accomplishing various operations. As mentioned above, in certain embodiments, the schedule processor forms a processing system or subsystem that includes one or more computing devices having memory, processing, and communication hardware. The processor may be a single device or a distributed device, and the functions of the processor may be performed by hardware and/or as computer instructions on a non-transient computer (or machine) readable storage medium. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. In certain embodiments, the processor includes one or more modules structured to functionally execute the operations of the schedule processor. The description herein including the components of the schedule processor emphasizes the structural independence of the aspects of the processor, and illustrates one grouping of operations and responsibilities of the processor. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of the analyzer operations are included in the section referencing FIGS. 2-3.

Example and non-limiting module implementation elements include sensors (e.g., sensors 222) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hardwired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The term "server" and/or "network" includes all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures. When information is transferred or provided over a network (e.g., FIG. 1) or another communications connection (either hardwired, wireless, or a combination of hardwired or wireless) to a machine, the machine properly views the connection as a computer (or machine) readable medium, like that described above. Thus, any such connection is properly termed a computer-readable medium.

What is claimed is:

1. A power generation system, comprising:
   a housing;
   a power generator operatively connected to an engine speed sensor and provided within the housing; and
   a control system disposed within the housing and having a processor, the control system communicably coupled to the engine speed sensor, the processor configured to:
      receive usage-based data regarding at least one usage-based component or consumable of the power generator, the usage-based data including at least one of when to perform maintenance of a charge air piping, a spark plug wire, a battery cable, a coolant filter, a turbocharger, an emergency stop control, an electrical cable, an engine cleaning, a heated oxygen sensor, a cylinder head, a cooling fan or a cooling fan drive belt, a fuel line seal, or a fuel pressure regulator;
      determine a usage-based service schedule for the one or more usage-based components or consumables based on the usage-based data;
      receive operation-based data regarding at least one of an operation-based component or consumable of the power generator, the at least one operation-based component or consumable including a spark plug, a volume of oil, an oil filter, or an air filter, at least a portion of the operation-based data received from the engine speed sensor;
      determine that at least one of an operation-based component or consumable is operating or predicted to operate outside of a predefined acceptable operating range based on the operation-based data;
      determine a predictive operation-based service schedule for the one or more operation-based components or consumables based on the operation-based data, wherein the predictive operation-based service schedule includes the at least one operation-based component or consumable operating or predicted to operate outside of the predefined acceptable operating range;
      generate a blended service schedule, the blended service schedule including the usage-based service schedule and the predictive operation-based service schedule;
      provide, to at least one of a local monitor or a remote monitor, the blended service schedule; and
      provide an alert to at least one of the local monitor or the remote monitor regarding the at least one operation-based component or consumable operating or predicted to operate outside of the predefined acceptable operating range;
   wherein the operation-based data includes at least one of an indication of a duration of operation, an engine speed, an oil temperature, a fuel consumption rate, an exhaust temperature, a compression ratio of an engine, a spark plug voltage, a brake mean effective pressure, an air-to-fuel ratio, a power output, or an engine temperature, of the power generator.

2. The system of claim 1, wherein the when to perform maintenance is based on the duration of operation of the power generator.

3. The system of claim 1, wherein the processor is configured to prioritize the one or more usage-based components or consumables and the one or more operation-based components or consumables in the blended service schedule based on at least one of an estimated time to completion, an ability to bundle service events, or an urgency of service due.

4. The system of claim 1, wherein the processor is configured to determine that at least one of an operation-based component or consumable is operating within a predefined acceptable operating range based on the operation-based data and include the at least one operation-based component or consumable operating within the predefined acceptable operating range on the predictive operation-based service schedule.

5. The system of claim 1, wherein the processor is configured to receive an input from one or more of an operator, a maintenance provider, or a distributor, the input including a service action taken in regard to a scheduled service event, and wherein the processor is configured to update the blended service schedule in response to the service action taken.

6. A power generation system, comprising:
   a housing;
   a power generator operatively connected to a plurality of sensors and provided within the housing; and
   a processor disposed within the housing, the processor configured to:
      receive usage-based data regarding one or more usage-based components or consumables of the power generator;
      determine a usage-based service schedule for the one or more usage-based components or consumables based on the usage-based data, wherein the usage-based components or consumables are replaced or serviced based on hours of operation or calendar time in service;
      receive operation-based data from the plurality of sensors regarding one or more operation-based components or consumables of the power generator;

determine that at least one of an operation-based component or consumable is operating or predicted to operate outside of a predefined acceptable operating range based on the operation-based data;

determine a predictive operation-based service schedule for the one or more operation-based components or consumables based on the operation-based data, wherein the operation-based components or consumables are replaced or serviced based on a predefined range of operation of the operation-based component or consumable, and wherein the predictive operation-based service schedule includes the at least one operation-based component or consumable operating or predicted to operate outside of the predefined acceptable operating range;

generate a blended service schedule, the blended service schedule including the usage-based service schedule and the predictive operation-based service schedule;

provide the blended service schedule to at least one of a local monitor or a remote monitor; and provide an alert to at least one of the local monitor or the remote monitor regarding the at least one operation-based component or consumable operating or predicted to operate outside of the predefined acceptable operating range.

7. The system of claim 6, wherein the processor is configured to prioritize the one or more usage-based components or consumables and the one or more operation-based components or consumables in the blended service schedule based on at least one of an estimated time to completion, an ability to bundle service events, or an urgency of service due.

8. The system of claim 6, wherein the processor is configured to selectively alter scheduled maintenance of one or more operation-based or usage-based components and consumables on the blended service schedule both forward and backward in time in the blended service schedule if within a predetermined threshold range for the component or consumable.

9. The system of claim 6, wherein the processor is configured to provide a notification based on the blended service schedule, wherein the notification includes at least one of a reminder regarding an upcoming service event or an alert to order a replacement component in advance of the upcoming service event.

10. The system of claim 6, wherein the processor is configured to receive an input from an operator, a maintenance provider, or a distributor, the input including a service action taken in regard to a scheduled service event, and wherein the processor is configured to update the blended service schedule in response to the service action taken.

11. The system of claim 10, wherein the service action taken includes at least one of a completion date, a dismissed date, or an extended date.

12. The system of claim 6, wherein the processor is configured to generate a combined blended service schedule, wherein the combined blended service schedule combines the blended service schedule of one or more associated power generators if geographically proximate or grouped together by an operator, a maintenance provider, or a distributor.

13. The system of claim 6, wherein the power generator includes at least one of a solid oxide fuel cell (SOFC) power generator, a proton exchange membrane (PEM) fuel cell power generator, a hybrid genset with energy storage, a variable speed genset, a fixed speed genset, a combined heat and power generator, or a combined heating, cooling, and power generator.

14. A monitoring system for a power generator, the monitoring system provided within a housing of the power generator, the monitoring system comprising:

a processor disposed within the housing, the processor configured to:

receive usage-based data regarding one or more usage-based components or consumables of the power generator;

determine a usage-based service schedule for the one or more usage-based components or consumables based on the usage-based data;

receive, from a plurality of sensors operatively connected to the power generator, operation-based data regarding one or more operation-based components or consumables of the power generator;

determine that at least one of an operation-based component or consumable is operating or predicted to operate outside of a predefined acceptable operating range based on the operation-based data;

determine a predictive operation-based service schedule for the one or more operation-based components or consumables based on the operation-based data, wherein the predictive operation-based service schedule includes the at least one operation-based component or consumable operating or predicted to operate outside of the predefined acceptable operating range;

generate a blended service schedule, the blended service schedule including the usage-based service schedule and the predictive operation-based service schedule;

provide the blended service schedule to at least one of a local monitor or a remote monitor; and provide an alert to at least one of the local monitor or the remote monitor regarding the at least one operation-based component or consumable operating or predicted to operate outside of the predefined acceptable operating range.

15. The system of claim 14, wherein the processor is configured to prioritize the one or more usage-based components or consumables and the one or more operation-based components or consumables in the blended service schedule based on at least one of an estimated time to completion, an ability to bundle service events, or an urgency of service due.

16. The system of claim 14, wherein the processor is further configured to provide a notification based on the blended service schedule, wherein the notification includes at least one of a reminder regarding an upcoming service event or a notification to order a replacement component in advance of the upcoming service event.

17. The system of claim 14, wherein the processor is further configured to receive an input from an operator, a maintenance provider, or a distributor, the input including a service action taken in regard to a scheduled service event, wherein the processor configured to update the blended service schedule in response to the input.

18. The system of claim 17, wherein the service action taken includes at least one of a completion date, a dismissed date, or an extended date.

19. The system of claim 14, wherein the processor is configured to generate a group blended service schedule, wherein the group blended service schedule combines one or more types of service from the blended service schedule of one or more associated power generators.

20. A tangible, non-transitory computer-readable storage medium having machine instructions stored therein, the tangible, non-transitory computer-readable storage medium provided within a housing of a power generator, the instructions being executable by a processor disposed within the housing to cause the processor to perform operations comprising:
- receiving usage-based data regarding one or more usage-based components or consumables of a power generator;
- determining a usage-based service schedule for the one or more usage-based components or consumables based on the usage-based data;
- receiving, from a plurality of sensors operatively connected to the power generator, operation-based data regarding one or more operation-based components or consumables of the power generator;
- determining that at least one of an operation-based component or consumable is operating or predicted to operate outside of a predefined acceptable operating range based on the operation-based data;
- determining a predictive operation-based service schedule for the one or more operation-based components or consumables based on the operation-based data, wherein the predictive operation-based service schedule includes the at least one operation-based component or consumable operating or predicted to operate outside of the predefined acceptable operating range;
- generating a blended service schedule, the blended service schedule including the usage-based service schedule and the predictive operation-based service schedule;
- providing the blended service schedule to at least one of a local monitor or a remote monitor; and
- providing an alert to the at least one of the local monitor or the remote monitor regarding the at least one operation-based component or consumable operating or predicted to operate outside of the predefined acceptable operating range.

21. The computer readable medium of claim 20, wherein the instructions are executable by the processor to cause the processor to prioritize the one or more usage-based components or consumables and the one or more operation-based components or consumables in the blended service schedule based on at least one of an estimated time to completion, an ability to bundle service events, or an urgency of service due.

22. The computer readable medium of claim 20, wherein the instructions are executable by the processor to cause the processor to receive an input from an operator, the input including a service action taken in regard to a scheduled service event.

23. The computer readable medium of claim 20, wherein the instructions are executable by the processor to cause the processor to provide a notification based on the blended service schedule, wherein the notification includes at least one of a reminder regarding an upcoming service event or a notification to order a replacement component in advance of the upcoming service event.

* * * * *